United States Patent [19]
Kazi

[11] Patent Number: 5,538,026
[45] Date of Patent: Jul. 23, 1996

[54] PILOT-OPERATED PROPORTIONAL CONTROL VALVE

[75] Inventor: Shaukat A. Kazi, Lincolnwood, Ill.

[73] Assignee: Parker-Hannifin Corporation, Cleveland, Ohio

[21] Appl. No.: 412,430

[22] Filed: Mar. 29, 1995

[51] Int. Cl.⁶ ................................................ F16K 31/02
[52] U.S. Cl. ...................... 137/1; 251/30.04; 251/129.08
[58] Field of Search .............................. 251/30.01, 30.02, 251/30.03, 30.04, 38, 30.05, 129.08; 137/1

[56] References Cited

U.S. PATENT DOCUMENTS

| | | |
|---|---|---|
| 1,764,366 | 6/1930 | Stuebing . |
| 1,989,341 | 1/1935 | Shenton . |
| 2,575,272 | 11/1951 | Harris . |
| 2,659,197 | 11/1953 | Halford et al. . |
| 2,672,888 | 3/1954 | Shields . |
| 2,673,706 | 3/1954 | Matteson . |
| 2,687,869 | 8/1954 | Kanuch . |
| 2,964,286 | 12/1960 | Hoskins . |
| 3,033,228 | 5/1962 | Mohler . |
| 3,079,952 | 3/1963 | Miller . |
| 3,154,285 | 10/1964 | Houle . |
| 3,307,823 | 3/1967 | Greer . |
| 3,351,316 | 11/1967 | Lewis et al. . |
| 3,903,919 | 9/1975 | Zeuner . |
| 4,113,174 | 9/1978 | Kagiyama et al. . |
| 4,304,264 | 12/1981 | McClintock et al. . |
| 4,494,726 | 1/1985 | Kumar et al. . |
| 4,526,340 | 7/1985 | Kolchinsky et al. . |
| 4,540,154 | 9/1985 | Kolchinsky et al. . |
| 4,544,128 | 10/1985 | Kolchinsky et al. . |
| 4,679,765 | 7/1987 | Kramer et al. . |
| 4,699,351 | 10/1987 | Wells . |
| 4,746,093 | 5/1988 | Scanderbeg ................ 251/30.04 |
| 4,799,645 | 1/1989 | Kramer et al. . |
| 5,002,253 | 3/1991 | Kolchinsky et al. . |
| 5,048,790 | 9/1991 | Wells . |
| 5,205,531 | 4/1993 | Kolchinsky . |
| 5,271,599 | 12/1993 | Kolchinsky et al. . |
| 5,301,920 | 4/1994 | Ichiki . |
| 5,328,148 | 7/1994 | Hartmut ................ 251/30.04 |

*Primary Examiner*—Kevin Lee
*Attorney, Agent, or Firm*—Christopher H. Hunter

[57] ABSTRACT

A pilot-operated proportional control solenoid valve includes a housing enclosing a main valve member and a pilot valve member which provide flow control from a side inlet to a nose outlet. The main valve member includes a first radial passage and a first longitudinal passage to a pilot valve chamber. A second radial passage and a second longitudinal passage interconnect the first longitudinal passage with the housing outlet. The pilot valve member comprises a hollow cylinder disposed within the first longitudinal passage in the main valve member. The pilot valve member includes a radial inlet at one end and a radial outlet at its outer end for fluid to flow from the housing inlet to the pilot valve chamber and bias the main valve member against a valve seat when the solenoid is de-energized. The pilot valve member normally abuts the main valve member to prevent fluid from flowing through an axial opening at the one end of the pilot valve member. When the solenoid is energized, the pilot valve member moves away from the main valve member and fluid flows through the axial opening at the one end. Another radial outlet along the length of the pilot valve member is also aligned with the second radial passage in the main valve member for fluid to flow to the housing outlet. When the solenoid is further energized, the main valve member moves away from the valve seat such that fluid flows directly from the housing inlet to the housing outlet.

24 Claims, 3 Drawing Sheets

5,538,026

PILOT-OPERATED PROPORTIONAL CONTROL VALVE

FIELD OF THE INVENTION

The present invention relates generally to solenoid control valves, and more particularly to a pilot-operated proportional control valve.

BACKGROUND OF THE INVENTION

Solenoid control valves are well-known and are suitable for a wide variety of applications. Solenoid control valves typically have a coil of wire surrounding an armature and an end cap or plug. The armature and cap are made of a ferro-magnetic material, and are coaxially arranged with an air gap therebetween. A valve member extends from the armature, and when the coils are energized, the armature, and hence the valve member, are moved due to magnetic flux forces through the air gap. For proportional solenoid control valves, the movement of the valve member is proportional to the input current or voltage on the solenoid coils.

One type of proportional solenoid control valve is a pilot-operated valve, that is, a valve which has a pilot valve member and a main valve member. The solenoid in such a valve controls the position of the armature to move either the main valve member to an actuated position, or the pilot valve to an actuated position to thereby allow movement of the main valve member. Pilot-operated valves are most typically used in high pressure situations where smooth control of the flow is necessary.

It is believed that pilot-operated proportional control valves can have certain limitations which make them undesirable in certain circumstances. In particular, these valves can have a complicated structure, which can make them costly and time-consuming to manufacture and assemble. Still others can require additional damping to stabilize the valve or to provide a smooth threshold control. Further, others do not maintain consistent performance at varying loads or pressures. Still others, like the valve shown in Kramer, U.S. Pat. No. 4,799,645, have a nose inlet and side outlet which make it difficult (or impossible) to use in place of many existing on/off (i.e., non-proportional) valves in the marketplace. This can prevent the on/off type of valves from being easily upgraded to a proportional type of valve.

Thus, it is believed there is a demand in the industry for a pilot-operated proportional control valve which has a simple structure, requires no additional damping for stable operation, has smooth threshold control, and achieves consistent performance at varying loads and pressure. Finally, it is believed there is a demand in the industry for a proportional control valve which can easily replace conventional on/off valves existing in the market, such that the on/off valves can be easily upgraded to the proportional valve simply by removing the existing on/off valve and replacing it with the proportional valve.

SUMMARY OF THE INVENTION

The present invention provides a novel and unique pilot-operated proportional control valve. The valve has a simple structure, does not require additional dampening, has smooth threshold control, and achieves consistent performance. Further, the valve has a side inlet and a nose outlet which allows it to easily replace many conventional on/off valves in the market when upgrading by the end user.

According to the principles of the present invention, the pilot-operated proportional control valve includes a housing enclosing a main valve member and a pilot valve member which are movable relative to each other and to the housing to provide proportional flow control from a side inlet to a nose outlet. The main valve member is closely received within the housing and includes a first radial inlet passage and a first longitudinal passage which interconnect the side inlet to a pilot valve chamber. A second radial passage and a second longitudinal passage interconnect the first longitudinal passage to the housing outlet. The main valve member is normally sealed against a valve seat in the housing.

The pilot valve member comprises a hollow cylinder disposed within the first longitudinal bore in the main valve member and movable axially therein. The pilot valve member includes at least one radial orifice at its inlet end and at least radial outlet orifice at its outlet end which provide for fluid communication between the inlet to the housing and the pilot valve chamber when the solenoid is de-energized. The pilot valve member normally abuts a portion of the main valve member to prevent fluid from flowing through an axial orifice at the inlet end of the pilot valve member. The pilot valve member also includes at least one radial outlet orifice along its length which is normally out of alignment with the second radial passage in the main valve member. Fluid entering the pilot valve chamber normally flows through the radial inlet orifice, upwardly through the central bore and outwardly through the radial outlet orifice at the outlet end of the pilot valve member to the pilot valve chamber. The pressure of the fluid in the pilot valve chamber biases the main valve member against the valve seat.

As the solenoid is energized, the pilot valve member is moved by the solenoid armature away from the main valve member, which uncovers the axial orifice at the inlet end of the pilot valve member and allows increased fluid flow through the pilot valve member. At the same time, the radial outlet orifice along the length of the pilot valve member becomes aligned with the second radial passage in the main valve member and allows fluid to flow to the outlet of the housing.

When the fluid flows from the housing inlet to the housing outlet, the pressure within the pilot valve chamber and the pilot valve member is reduced, which causes the main valve member to move away from the valve seat, thereby allowing fluid to flow directly from the housing inlet to the housing outlet. When the solenoid is fully energized, the main valve member moves away from the valve seat until the outlet pressure approaches (or reaches) the inlet pressure.

When the solenoid is de-energized, the pilot valve member moves toward the main valve member to cover the axial orifice at the inlet end of the pilot valve member. At the same time, the radial outlet orifice along the length of the pilot valve member is closed. The pressure within the pilot valve chamber increases, which thereby moves the main valve member against the valve seat to prevent fluid flow to the housing outlet.

The main valve member and pilot valve member are formed from only a few components, require only a few bores to be formed therein for the flow passages, and are easy to assemble. The simple structure also provides for smooth threshold control, does not require additional damping, and provides consistent performance at varying loads or pressures. The side inlet and nose outlet for the valve allows the valve to easily replace many existing on/off valves in the market merely by removing the on/off valves and replacing them with the proportional valve of the present invention.

Other features and advantages of the present invention will become more apparent upon reviewing the following specification and accompanying drawings.

DETAILED DESCRIPTION OF THE PREFERRED EMBODIMENT

Figure 1:
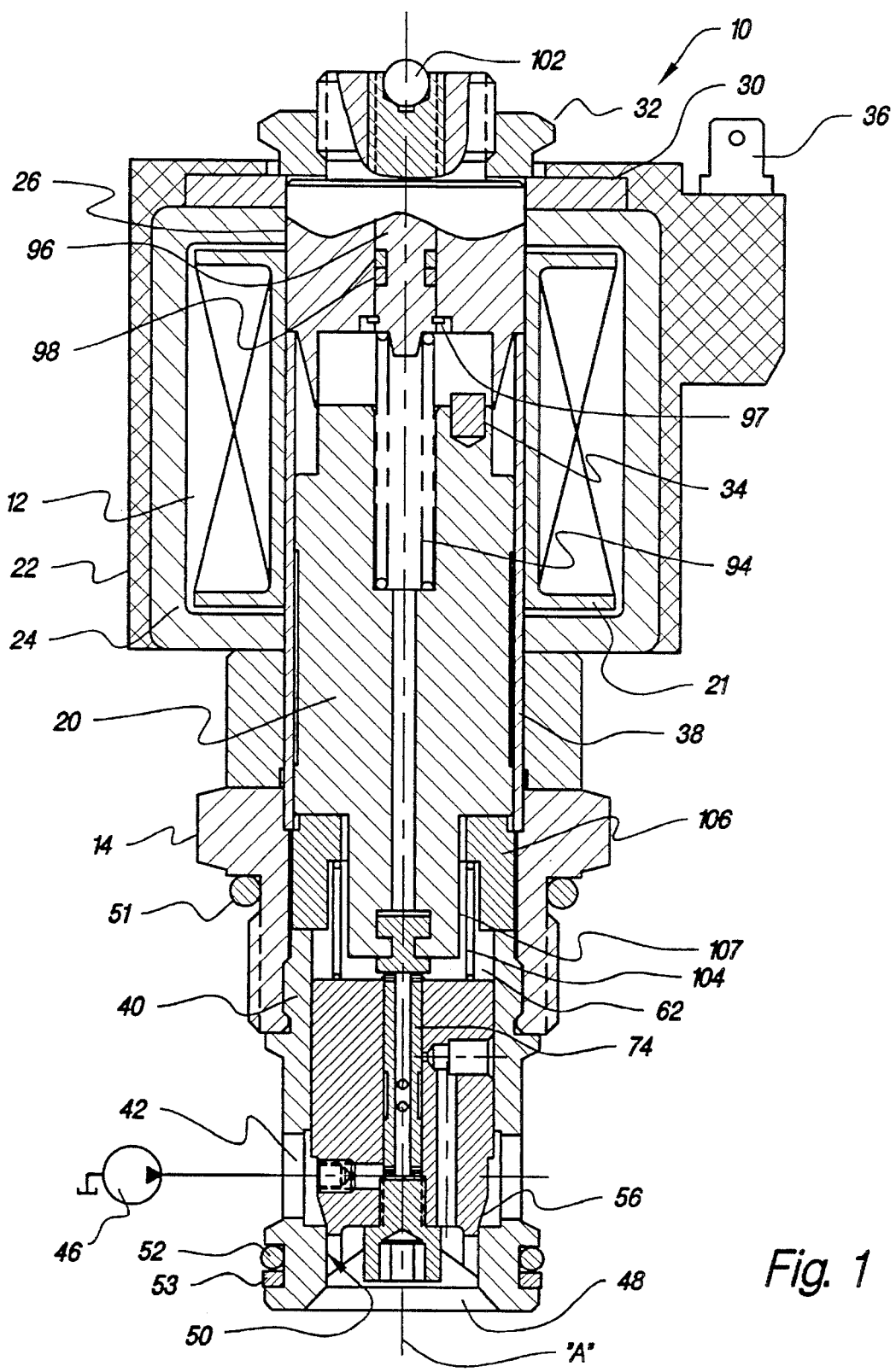
FIG. 1 is a cross-sectional view of a proportional control valve constructed according to the principles of the present invention.

Referring to the drawings, and initially to FIG. 1, the pilot-operated proportional control valve of the present invention is indicated generally at 10. The valve 10 includes a solenoid coil 12 and a hollow base 14 surrounding an armature or plunger 20. The coil 12 is wound around a bobbin 21 and enclosed within a housing assembly consisting of an outer cover 22, an inner shell 24 and an end plug 26. End plug 26 is received through an opening in end plate 30 and retained by threaded nut 32. A minimum air gap is provided between armature 20 and end plug 26 by non-magnetic, non-adjustable pin 34 pressed in armature 20. Coils 12 can be energized through electrical contacts 36 mounted to outer cover 22 and internally connected to windings of coil 12. The base 14 and end plug 26 are spaced apart by a hollow cylindrical tube 38. A hollow housing sleeve 40 is received by base 14 and is threadably and sealingly connected thereto. The housing base 14, armature 20, end plug 26 and shell 24 are made from ferro-magnetic materials, while pin 34, tube 38 and housing sleeve 40 are made of non-magnetic material, such as stainless steel.

Sleeve 40 has an inlet 42 formed along the side of the sleeve and extending radially inward for connection to a source of fluid pressure, such as pump 46. Sleeve 40 also has an outlet formed along the longitudinal axis "A" of the housing at the distal end (nose) of the sleeve for connecting to a fluid-operated device such as a hydraulic cylinder (not shown). The distal end of housing sleeve 40 forms an annular main valve seat, indicating generally at 50, between outlet 48 and inlet 42. An O-ring seal 51 is provided in a groove around the periphery of base 14, while O-ring seal and back-up ring 53 are provided in a groove around the periphery of housing sleeve 40 for forming a seal with the connections to the pump and hydraulic cylinder, and which thereby allows easy, fluid-tight connection within conventional systems.

Figure 2:
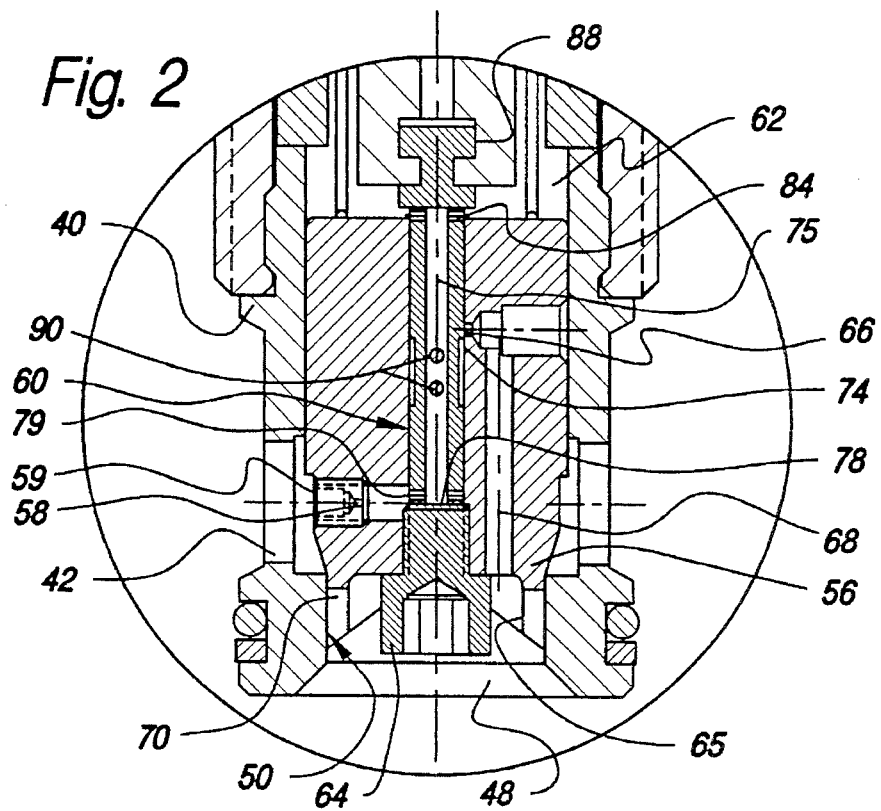
FIG. 2 is an enlarged cross-sectional view of certain valve members in the control valve when the valve is de-energized.

Referring now to FIG. 2, a main valve member or poppet 56 is closely received and axially moveable within housing sleeve 40. Main valve member 56 includes a radially-extending blind entrance bore or passage 58 which is normally aligned with housing inlet 42. Entrance bore 58 can include an adjustable metering screw 59 or can narrow down to an orifice of an appropriate diameter. Main valve member 56 also includes a longitudinally-extending central through-bore or passage, indicated generally at 60, extending upward (as viewed in FIG. 1) from the inner end of entrance bore 58. Bore 60 extends to a pilot valve chamber 62 formed in housing sleeve 40 between main valve member 56 and armature 20. For ease of manufacturing, central bore 60 can be formed entirely through main valve member 56 and a threaded end screw 64 can be received in the lower end of this bore to fluidly seal the end of the bore. End screw 64 is located within a counterbore 65 formed at the distal end of main valve member 56.

The main valve member 56 further includes a second radially-extending blind bore or passage 66 which connects at about the midpoint of bore 60. The radially outer end of bore 66 can be closed, such as for example by a plug, however, the inside surface of housing sleeve 40 also acts as an effective plug for this bore. A second longitudinally-extending blind bore or passage 68 extends downwardly from bore 66 to housing outlet 48. Second bore 68 preferably extends parallel to first longitudinal bore 60 from radial bore 66 to counterbore 65. Main valve member 56 narrows or tapers inwardly at its distal end to normally seal against valve seat 50, and thereby prevents fluid from passing directly from housing inlet 42 to housing outlet 48. A plurality of radially-extending passages 70 extend from the exterior of the main valve member at its distal end into counterbore 65 for reasons which will be described herein in more detail.

A pilot valve member or spool 74 is received within central bore 60 of main valve member 56. Pilot valve member 74 comprises a hollow cylinder which fits closely within bore 60. Pilot valve member 74 has a central bore 75 with an axial inlet orifice 78, and a plurality of radially-extending orifices 79 into bore 75 formed proximate one end. Pilot valve member 74 normally rests against the end surface of the shank of screw 64, thus closing axial inlet orifice 78. Radial inlet orifices 79, however, are normally aligned with radial passage 58 in main valve member 56, and fluid can flow from inlet 42 to central bore 75. The other end of pilot valve member 74 includes radial outlet orifices 84 which direct fluid from the central bore 75 into pilot valve chamber 62. The upper end of the pilot valve member 74 has a spool 88 preferably formed in one piece with the pilot valve member and which is received within a corresponding flanged opening (not numbered) in armature 20, and thereby couples pilot valve member 74 to armature 20.

Pilot valve member 74 further includes one, and preferably at least two, radial outlet orifices 90 formed at a predetermined location along the length of pilot valve member 74. Radial outlet orifices 90 are normally out of alignment with radial bore 66 in main valve member 56, and thus fluid flow is normally prevented therebetween.

Referring again to FIG. 1, a spring 94 extends between a longitudinally-extending counterbore formed in armature 20 and a spring button formed on the lower end of a spring adjuster 96. Spring adjuster 96 is threadably received within a longitudinally-extending through-bore formed in end plug 26 and has a snap ring 97 at its lower end. A pair of O-ring type elastomeric seals 98 fluidly seal spring adjuster 96 within end plug 26. Spring adjuster 96 has a slot on its outer end which is externally accessible with, e.g., a screw driver, for adjusting the spring adjuster. After the spring adjuster is properly adjusted, a ball 102 can be forced into the open end of the spring adjuster to lock the spring adjuster with respect to the end plug 26. Adjustment of spring adjuster 96 changes the bias on spring 94, as will be described herein in more detail.

A spring 104 is also received within chamber 62 and extends between the upper surface of main valve member 56 and an inwardly-directed annular shoulder of a spring guide 106. Spring guide 106 is received around an outwardly-extending neck 107 at the lower end of the armature 20 and is retained within hollow base 14 by housing sleeve 40. Adjustment of spring adjuster 96 also adjusts the bias on spring 104 through armature 20.

During operation, the housing inlet 42 is connected to a fluid supply and the housing outlet 48 is connected to a fluid-operated device. Fluid through the inlet 42 travels through a first flow path from radial entrance 58, through radial inlet orifices 79 at the lower end of pilot valve member 74, axially upward through pilot valve member 74, and radially outward through radial outlet orifices 84 into pilot valve chamber 62. When the solenoid is de-energized, axial opening 78 to bore 75 in pilot valve member 74 is closed because of pilot valve member 74 abutting the shank of screw 64. Radial outlet orifices 90 along the length of pilot member 74 are out of alignment with radial bore 66 in main valve member 56, and hence are also closed. The fluid in chamber 62 is therefore at inlet pressure and acts to bias main valve member 56 downwardly against valve seat 50.

Figure 3:
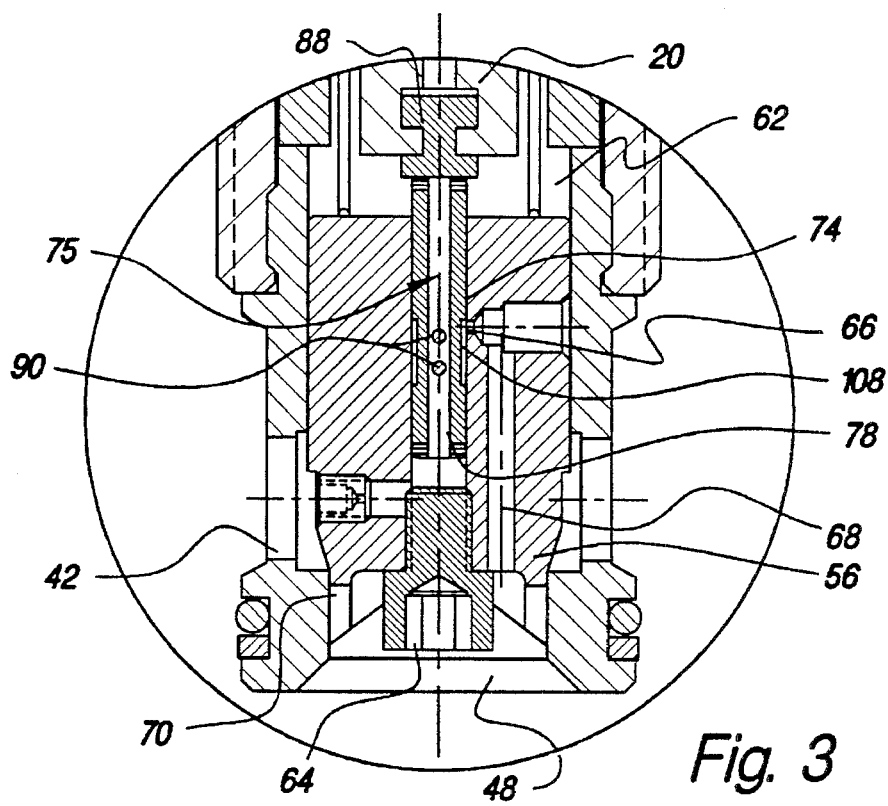
FIG. 3 is an enlarged cross-sectional view of the valve members of the control valve when the valve is initially energized.

When the solenoid is initially energized, as shown in FIG. 3, armature 20 is caused to move upwardly against spring 94, which pulls pilot valve member 74 upwardly because of the mechanical coupling by spool 88. Since pilot valve chamber 62 is at input pressure, the movement of pilot valve member 74 occurs at the same input signal to the solenoid, regardless of variations in the input pressure. As pilot valve member 74 moves upwardly, it moves away from screw 64, thus providing greater fluid flow through axial inlet opening orifice 78 into central bore 75. At the same time, radial outlet orifices 90 along the length of pilot valve member 74 become aligned with radial bore 66 in main valve member 56, such that a second flow path is provided through longitudinal bore 68 to housing outlet 48. Pilot valve member 74 can have a reduced outer diameter portion 108 around outlet orifices 90 to facilitate flow through orifices 90 to radial bore 60. Thus, it is not necessary for outlet orifices 90 in pilot valve member 74 to be circumferentially aligned with radial bore 66 in order for fluid to flow therebetween.

Figure 4:
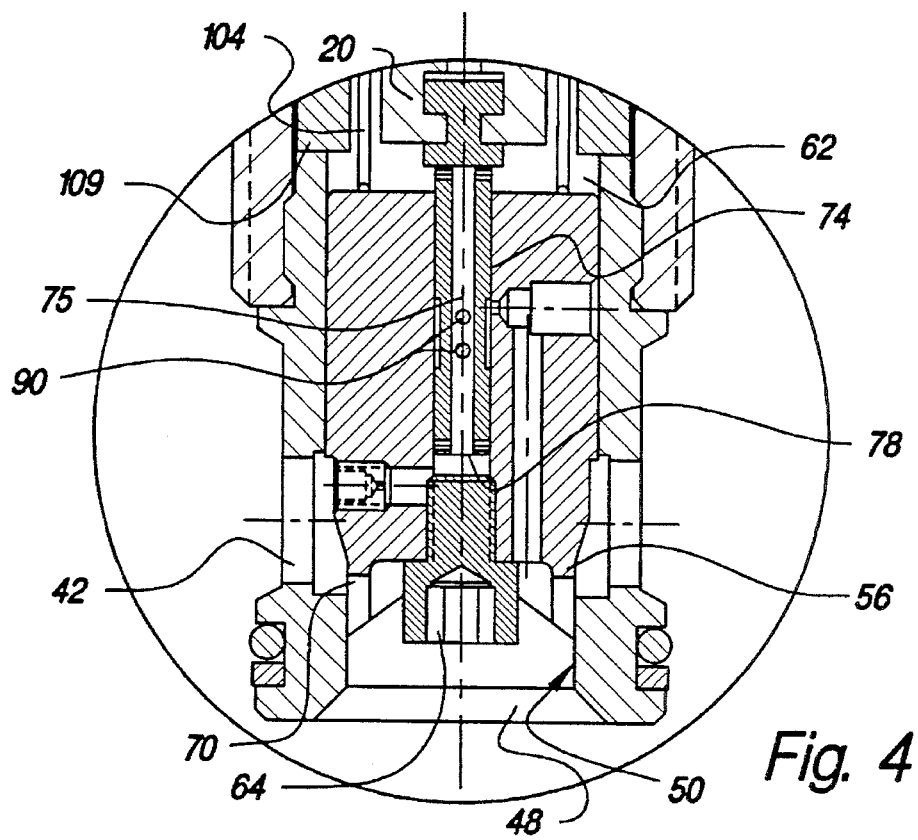
FIG. 4 is an enlarged cross-sectional view of the valve members of the control valve when the valve is fully energized.

When orifices 90 are opened, the pressure within pilot valve chamber 62 and central bore 75 is reduced. This reduced pressure allows main valve member 56 to move upwardly against spring 104 and away from valve seat 50, as shown in FIG. 4. The reduced pressure is applied against practically the entire upper surface of main valve member 56 which provides for smooth response of the main valve member. The reduced pressure also assists in moving pilot valve member 74 upwardly. As main valve member 56 moves away from valve seat 50, fluid flows through a third flow path from housing inlet 42 directly to housing outlet 48 through the radial passages 70 in the main valve member 56. Spring 104 provides that main valve member 56 moves smoothly and evenly in proportion to the movement of pilot valve member 74, and hence in proportion to the input signal amplitude or current on the solenoid.

The cooperating structure of main valve member 56 and pilot valve member 74 allow smooth changes in fluid flow between inlet 42 and outlet 48 as the solenoid is energized. As the current or voltage through the solenoid is increased, the main valve member 56 moves further upwardly and increases the flow to housing outlet 48. This continues until full voltage or current is reached and the housing outlet pressure approaches (or reaches) the housing inlet pressure and full flow is seen at housing outlet 48.

The amplitude or current on the solenoid coils at which the armature is initially moved to open the pilot valve member, and then the further amplitude or current which is necessary to also move the main valve member, can vary depending upon the spring constant on springs 94 and 104, the size of the armature, the length and number of coils on the bobbin, and other factors as should be known to those skilled in the art. Further, as described previously, the spring adjuster 96 allows adjustment of the armature movement for particular valve requirements. As such, the valve is suitable for a wide variety of applications.

When the solenoid is de-energized, armature 20 is moved downwardly by spring 94, which thereby moves pilot valve member 74 downwardly such that axial inlet opening 78 seats against screw 64. As this occurs, the radial outlet orifices 90 in pilot valve member 74 are closed off, which increases the fluid pressure within chamber 62, and thereby moves main valve member 56 downwardly against valve seat 50 to close off the fluid flow to the housing outlet.

Figure 5:
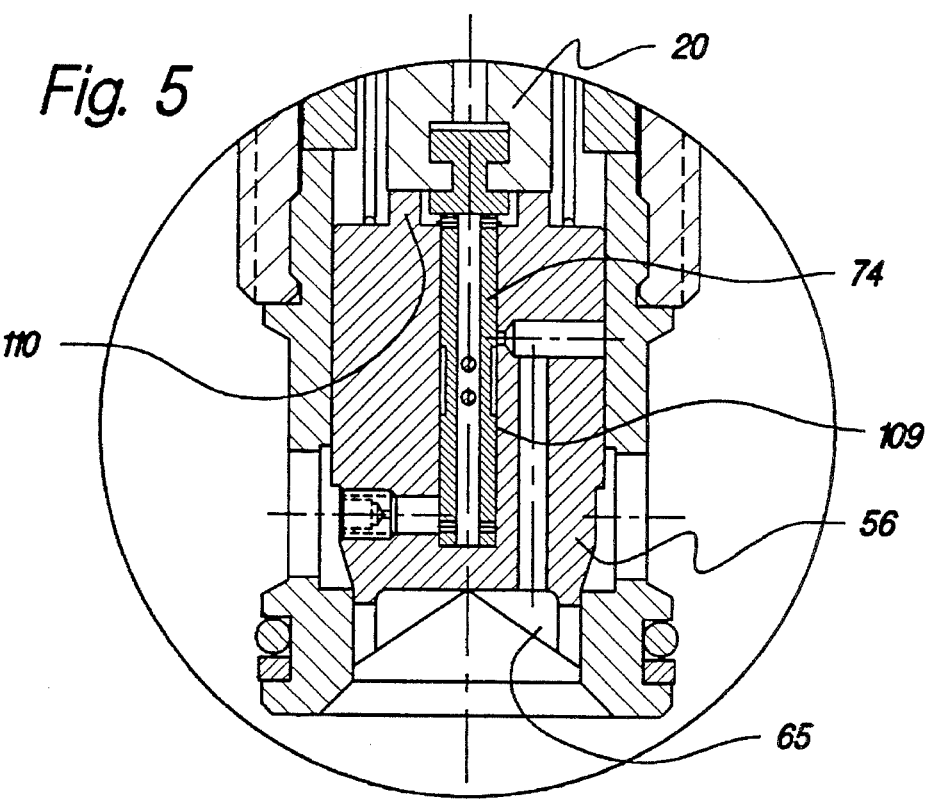
FIG. 5 is an enlarged cross-sectional view of the valve members of an additional embodiment of the control valve of the present invention.

An alternative embodiment of the pilot-operated control valve is shown in FIG. 5. In this embodiment, main valve member 56 has a blind bore, indicated generally at 109, which terminates within the main valve member. Such a structure does not require set screw 64 as in the first embodiment, and thus decreases assembly steps. In addition, an annular stroke stop 110 can be formed at the upper end of main valve member 56 to contact armature 20 when the solenoid is de-energized to limit the downward movement of pilot valve member 74 in bore 109, and thus create a gap between the lower distal end of the pilot valve member and the bottom of bore 109. Otherwise, the main valve member and pilot valve member (and the remainder of the valve structure) of the second embodiment is the same as in the first embodiment, and will not be discussed herein for the sake of brevity.

Thus, as described above, the control valve of the present invention has a simple structure which reduces manufacturing and assembly costs, is stable, has smooth threshold control and consistent performance at varying loads or pressures.

The principles, preferred embodiments and modes of operation of the present invention have been described in the foregoing specification. The invention which is intended to be protected herein should not, however, be construed as limited to the particular form described as it is to be regarded as illustrative rather than restrictive. For example, while the valve described above is a normally-closed valve, that is, when the solenoid is de-energized, fluid is prevented from flowing from the inlet to the outlet, it should be apparent to those skilled in the art that the principles of the present invention could easily be applied to a normally open valve. Other variations and changes may be made by those skilled in the art without departing from the scope and spirit of the invention as set forth in the appended claims.

What is claimed is:

1. A pilot-operated solenoid control valve, comprising:

a housing extending along a central axis and defining an inlet extending perpendicular to the central axis for directing fluid into the housing, an outlet extending along the central axis for directing fluid out of the housing, and a pilot valve chamber;

a main valve member received within said housing and moveable along the central axis, said main valve member having a first bore extending along the central axis of the main valve member; and a pilot valve member received within and axially moveable within the first bore in the main valve member, a first flow path defined through the pilot valve member from said housing inlet to said pilot valve chamber when said solenoid is de-energized, a second flow path defined through the pilot valve member and said main valve member from said housing inlet to said housing outlet when said solenoid is initially energized, and a third flow path defined directly from said housing inlet to said housing outlet when said solenoid is further energized.

2. The pilot-operated solenoid control valve as in claim 1, wherein said second flow path has a first portion which extends along the first flow path and a second portion which extends separately from the first flow path.

3. The pilot-operated solenoid control valve as in claim 2, wherein said third flow path is separate from said first and second flow paths.

4. The pilot-operated solenoid control valve as in claim 3, wherein said first flow path extends axially through the pilot valve member.

5. The pilot-operated solenoid control valve as in claim 1, wherein said first flow path remains open from said housing inlet to said pilot valve chamber when said solenoid is initially energized and further energized.

6. The pilot-operated solenoid control valve as in claim 1 wherein said second flow path remains open from said housing inlet to said housing outlet when said solenoid is initially energized and further energized.

7. The pilot-operated solenoid control valve as in claim 1, wherein said second flow path extends axially through said pilot valve member, radially through the main valve member, and then axially through the main valve member.

8. The pilot-operated solenoid control valve as in claim 7, wherein said second flow path extends radially through the main valve member separate from said pilot valve member.

9. The pilot-operated solenoid control valve as in claim 1, wherein said first flow path and said second flow path extend together through a portion of said pilot valve member.

10. The pilot-operated solenoid control valve as in claim 1, wherein said pilot valve chamber is defined between an armature of the solenoid and said main valve member.

11. A pilot-operated control valve, comprising:

a housing extending longitudinally along a central axis and defining an inlet opening, an outlet opening, and a pilot valve chamber;

a main valve member received within said housing and normally being seated against a valve seat, said main valve member having a first passage extending longitudinally through the main valve member, a second passage extending radially from the first passage to the housing inlet, a third passage extending longitudinally through the main valve member parallel to the first passage, and a fourth passage extending radially between the first passage and the third passage; and a pilot valve member received within the first passage in the main valve member and moveable along the central axis of the main valve member, said pilot valve member having a central passage extending longitudinally therethrough and defining a first flow path from said housing inlet through said first passage in said main valve member to said pilot valve chamber, said pilot valve member having an outlet orifice along the length of the pilot valve member communicating with the central passage in the pilot valve member, said outlet orifice normally being out of alignment with the fourth passage in the main valve member and being moveable into alignment with the fourth passage to define a second fluid path through the third passage to said housing outlet, and a third fluid path defined directly from said housing inlet to said housing outlet when said main valve member moves away from said valve seat.

12. The pilot operated control valve as in claim 11, wherein said pilot valve member includes a radially-extending inlet orifice at an inlet end fluidly connecting the second passage in the main valve member with the central passage of the pilot valve member.

13. The pilot-operated control valve as in claim 11, wherein the outer dimension of said pilot valve member includes a radially smaller portion in the area surrounding the outlet orifice along the length of the pilot valve member.

14. The pilot-operated control valve as in claim 11, wherein said main valve member and said pilot valve member are moveable in said housing in conjunction with each other in proportion to an input signal to said valve.

15. A method for controlling fluid through a pilot-operated solenoid proportional flow control valve, comprising the steps of:

providing a pilot-operated solenoid proportional flow control valve having:

i) a housing extending along a central axis and defining an inlet extending perpendicular to the central axis for directing fluid into the housing, an outlet extending along the central axis for directing fluid out of the housing, and a pilot valve chamber;

ii) a main valve member received within said housing and moveable along the central axis, said main valve member having a first bore extending along the central axis of the main valve member; and iii) a pilot valve member received within and axially moveable in the first bore in the main valve member, a first fluid path defined through the pilot valve member from said housing inlet to said pilot valve chamber when said solenoid is de-energized, a second fluid path defined through the pilot valve member and said main valve member from said housing inlet to said housing outlet when said solenoid is initially energized, and a third fluid path defined directly from said housing inlet to said housing outlet when said solenoid is further energized, directing fluid through said housing inlet, controlling the movement of said pilot valve member and said main valve member so as to meter the fluid through the valve, and directing the fluid out through the housing outlet.

16. The method as in claim 5, further comprising the step of maintaining fluid flow from said housing inlet to said pilot valve chamber when said solenoid is initially energized and further energized.

17. The method as in claim 15, further comprising the step of maintaining fluid flow from said housing inlet to said housing outlet when said solenoid is initially energized and further energized.

18. The method as in claim 15, further comprising the step of initially moving said pilot valve member in an upward axial direction in said housing while said main valve member remains stationary, said upward movement opening said second fluid path and directing fluid from said housing inlet to said housing outlet through said second fluid path.

19. The method as in claim 15, wherein said step of providing a pilot-operated solenoid proportional flow control valve further includes providing said second fluid path axially through said pilot valve member, radially through said main valve member, and then axially through said main valve member.

20. A pilot-operated solenoid control valve, comprising:

a housing extending along a central axis and defining an inlet extending perpendicular to the central axis for directing fluid into the housing, an outlet extending along the central axis for directing fluid out of the housing, and a pilot valve chamber;

a main valve member received within said housing and moveable along the central axis, said main valve member having a first bore extending along the central axis of the main valve member; and a pilot valve member received within and axially moveable within the first bore in the main valve member, a first flow path defined axially through the pilot valve member from said housing inlet to said pilot valve chamber when said solenoid is de-energized; a second flow path defined through the pilot valve member and said main valve member from said housing inlet to said housing outlet when said solenoid is initially energized, said second flow path having a first portion which extends axially along the first flow path and a second portion which extends separately from the first flow path radially through the main valve member and then axially through the main valve member; and a third flow path, separate from said first and second flow paths, defined directly from said housing inlet to said housing outlet when said solenoid is further energized.

21. The pilot-operated solenoid control valve as in claim 20, wherein said third flow path extends radially through the main valve member.

22. The pilot-operated control valve as in claim 21, wherein the central passage in said pilot valve member has an axial opening at its distal end which is closed when the pilot valve member is out of alignment the main valve member, and is open when the pilot valve member moves into alignment with the main valve member.

23. The pilot-operated control valve as in claim 22, wherein the pilot valve member abuts a portion of the main valve member to cover the axial opening at the distal end of the pilot valve member when the pilot valve member is out of alignment with the main valve member.

24. The pilot-operated control valve as in claim 23, wherein the pilot valve member also includes a radially-extending outlet orifice at an outlet end fluidly connecting the central passage of the pilot valve member with said pilot valve chamber.

* * * * *